Nov. 14, 1961     F. N. PIASECKI     3,008,665
HELICOPTER AND BALLOON AIRCRAFT UNIT
Filed March 17, 1958     3 Sheets-Sheet 2
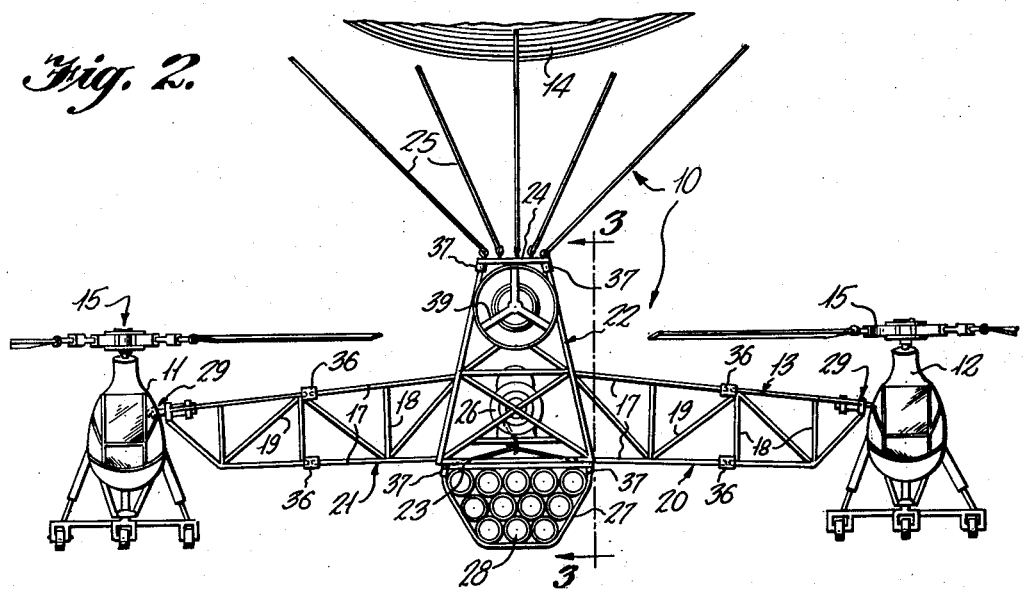
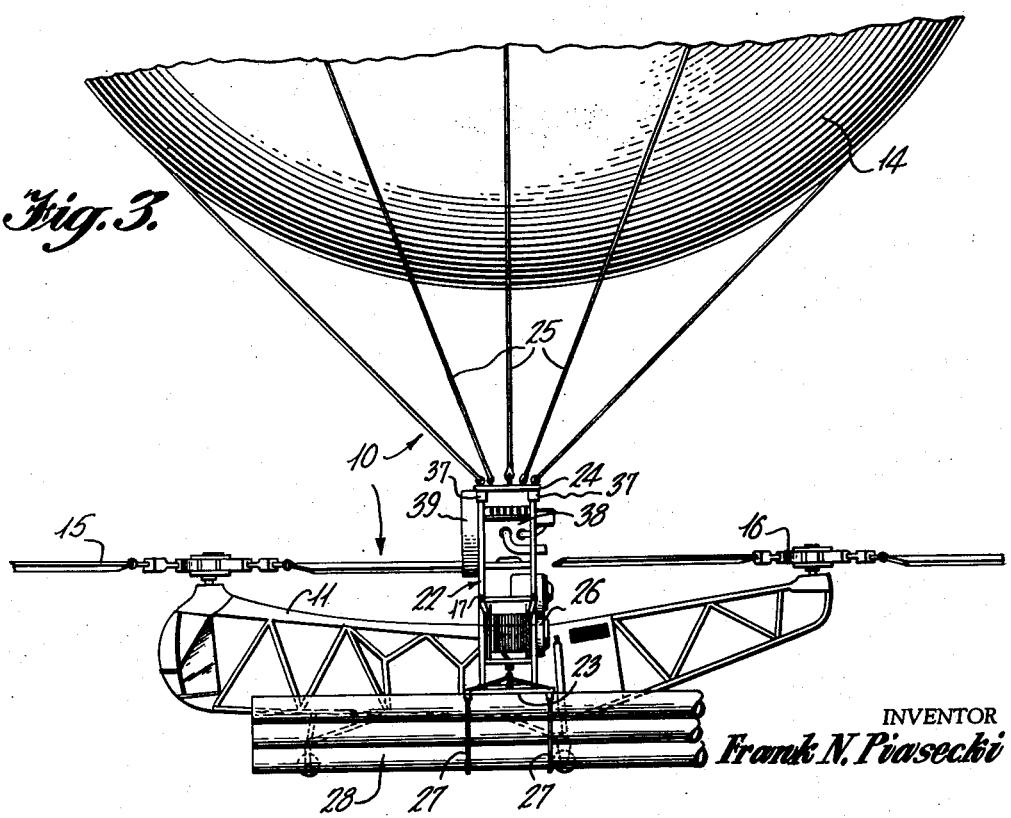
INVENTOR
Frank N. Piasecki
BY Mason, Fenwick & Lawrence
ATTORNEYS Nov. 14, 1961  F. N. PIASECKI  3,008,665
HELICOPTER AND BALLOON AIRCRAFT UNIT
Filed March 17, 1958  3 Sheets-Sheet 3

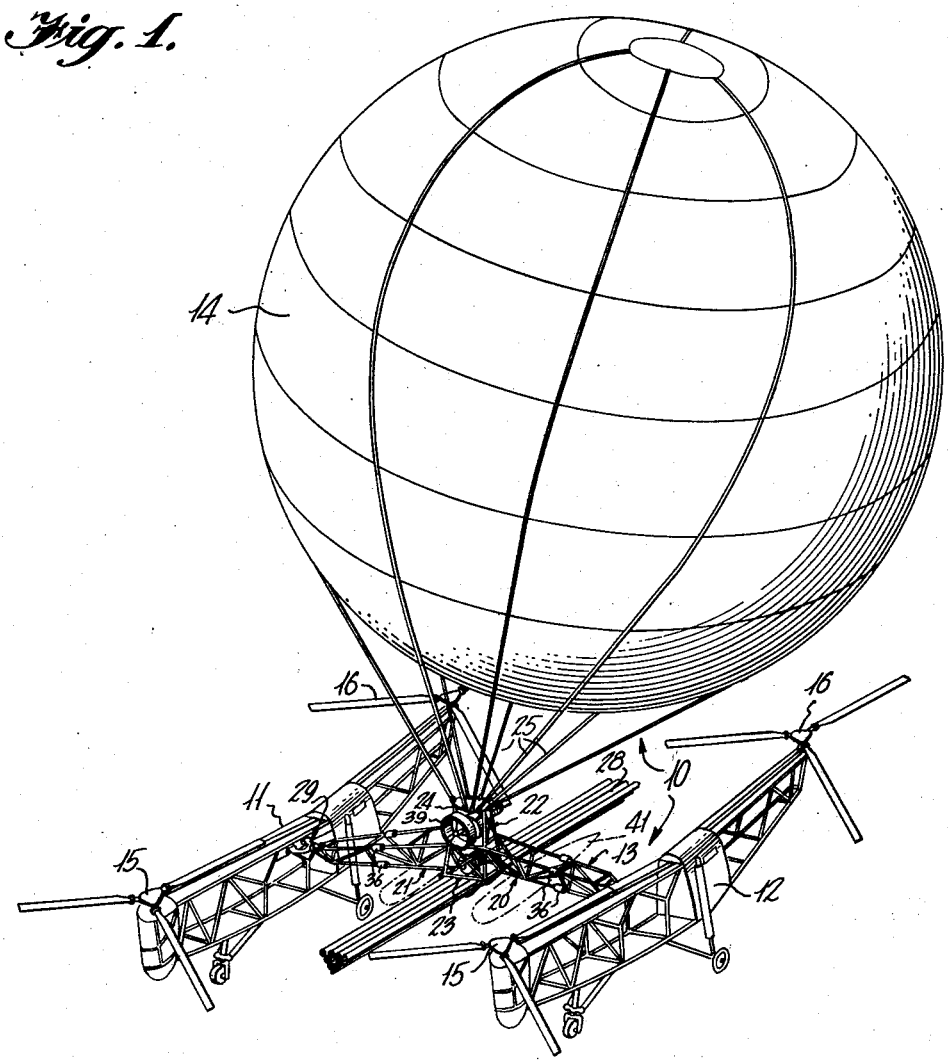

INVENTOR
Frank N. Piasecki

BY Mason, Fenwick & Lawrence
ATTORNEYS

United States Patent Office 3,008,665
Patented Nov. 14, 1961

3,008,665
HELICOPTER AND BALLOON AIRCRAFT UNIT
Frank N. Piasecki, Tunbridge Road, Haverford, Pa.
Filed Mar. 17, 1958, Ser. No. 721,826
8 Claims. (Cl. 244—2)

The present invention relates in general to helicopters, and more particularly to an assembly of a plurality of interconnected helicopters and a balloon forming an aircraft unit particularly suitable for transporting heavy loads.

An object of the present invention is the provision of an aircraft unit of the helicopter type which is capable of lifting heavy loads beyond the normal capability of helicopters.

Another object of the present invention is the provision of a novel aircraft unit including two or more helicopters which is capable of lifting and transporting loads of considerably greater weight than a corresponding number of conventional helicopters can sustain.

Another object of the present invention is the provision of a novel aircraft unit which is operable for vertical take-offs and landings and air-borne propulsion in the general manner of helicopter type aircraft, and which is capable of lifting and transporting heavy loads beyond the normal capacity of helicopters over impassable terrain.

Another object of the present invention is the provision of a novel aircraft unit including a plurality of interconnected helicopters, wherein the helicopters are relieved of the burden of supporting the weight of the helicopters and the weight of the interconnecting facility so that substantially the entire lifting force of the helicopters is available to support the weight of a payload.

Another object of the present invention is the provision of an aircraft unit including a plurality of interconnected helicopters for air-borne transportation of heavy payloads, wherein the helicopters are freed of the burden of supporting the weight of the helicopters, the weight of the interconnecting facility and the major portion of the payload weight, so that the forces produced by the helicopter rotors are available primarily to provide propulsion and control of the aircraft unit.

Another object of the present invention is the provision of an aircraft unit employing a plurality of helicopters secured together by an interconnecting facility in such a manner as to permit the helicopters to land and take-off with the interconnecting facility attached.

Another object of the present invention is the provision of an aircraft unit including at least a pair of helicopters interconnected by a rigid beam structure in such a manner that the helicopters are preferably restrained against relative movement in yaw but are free, within limits, for movement in pitch and roll, so as to permit the use of tandem rotor helicopters to utilize their towing ability without danger of the rotor blades of one of the helicopters interfering with the operation of the rotors of the other helicopter of the pair.

Other objects, advantages and capabilities of the present invention will become apparent from the following detail description, taken in conjunction with the accompanying drawings illustrating one preferred embodiment of the invention.

In the drawings:

FIGURE 1 is a perspective view of an assembly of a balloon and a pair of helicopters embodying the present invention;

FIGURE 2 is a front elevation view of the helicopter balloon assembly;

FIGURE 3 is a vertical longitudinal section view of the assembly, taken along the line 3—3 of FIGURE 2;

Figure 4:
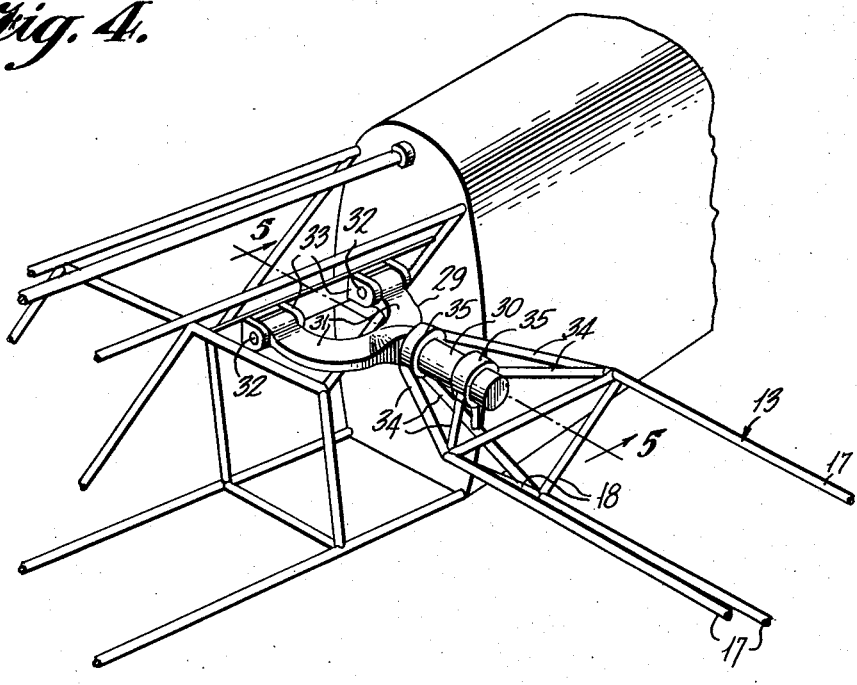
FIGURE 4 is a perspective view of an exemplary connecting facility for connecting one of the helicopters to the interconnecting transverse beam structure.

The present invention, in general, comprises a composite aircraft having operational characteristics in regard to take-off, landing, and propulsion similar to those encountered in helicopter type aircraft, by providing a basic unit consisting of two or more helicopters, which are preferably of the tandem rotor type, interconnected by a rigid beam structure to provide coordinate operation of the helicopters as a unit, together with a large balloon secured to the beam structure above its center of gravity to provide partial support of the assembly with payload, or partial support of the assembly less payload. The balloon may be of such a size that its buoyancy is slightly less than the weight of the entire assembly including the helicopters and the interconnecting beam, but excluding the weight of the payload, in which case the payload is entirely supported by the helicopter rotors which are relieved of the requirement of supporting the weight of the rest of the assembly. Alternatively, the balloon may have a buoyancy approximately equal to the weight of the entire assembly including the payload, in which case the helicopters furnish primarily only propulsion and control of the assembly. In this arrangement, some ballast means such as water ballast would be necessary to restore proper loading of the rig when the payload is released. The mounting facility by which the ends of the rigid beam structure are secured to the helicopters is such that each helicopter is free to rotate to a limited extent relative to the beam in both pitch and roll but is preferably rigidly restrained against movement relative to the beam in yaw, thereby permitting the use of tandem helicopters in such a manner as to utilize their desirable towing characteristics but relieving the assembly of the danger of rotor blades of one helicopter interfering with operation or otherwise damaging the rotors of the other helicopter of an interconnected pair. By this arrangement, a composite aircraft is provided which has vastly superior payload transporting characteristics relative to conventional helicopters or a composite assembly in which a single helicopter and balloon are provided.

Referring to the drawings illustrating an exemplary form of a composite aircraft unit embodying the present inventions, wherein like reference characters designate corresponding parts throughout the several figures, the composite assembly, indicated generally by the reference character 10, is made up of a number of subassemblies including tandem rotor helicopters 11 and 12, an interconnecting rigid beam subassembly 13 and a balloon unit 14. The helicopters 11, 12 are arranged in side-by-side, substantially laterally aligned relation with their fore-and-aft axes extending in parallel vertical planes and are rigidly held by the interconnecting beam structure 13 against angular displacement in yaw or about the vertical axis from their parallel longitudinal relationship in a manner hereinafter described to prevent occurrence of any interference between the forward rotors 15 or the rear rotors 16 of the helicopters. In the preferred example herein illustrated, the rigid beam structure 13 is in the form of a transversely extending beam of triangular configuration in cross-section formed of longitudinally extending structural elements 17 arranged in a triangular pattern, although it may be of rectangular or other closed section, and interconnecting cross bracing elements 18 and diagonal elements 19 integrated as by welding or the like to form a rigid structural frame. These structural elements form arm portions 20 and 21 extending oppositely from a tower portion 22 likewise formed of elongated structural elements integrated into a rigid structural frame, to which the arm portions 20, 21 are rigidly secured at their inner ends. The tower portion 22 is located at the center of gravity of the assembly of helicopters 11, 12 and the beam 13 and the structural elements forming the same may be arranged to provide a horizontal square frame 23 at the lower end of the tower portion 22 and a circular frame 24 at the upper end of the tower portion 22. The tower portion projects a substantial distance above the uppermost extremities of the arm portions 20, 21 of the beam structure 13 and the circular frame 24 at the upper end thereof provides the anchoring facility for the balloon rigging lines, generally indicated at 25, which extend about the balloon 14 and secures the same to the tower portion 22.

A suitable power operated hoist of conventional construction, indicated generally by the reference character 26, operated from one of the helicopters 11, 12, is supported in the tower portion 22 of the beam 13 and load supporting cables 27 depend from the square frame 23 and are controlled by the hoist mechanism 26 to support the payload, schematically indicated at 28, in suspended relation below the tower portion 22 of the beam structure. The arrangement of the beam structure including the tower portion 22 is such that the balloon ascends above the center of gravity of the helicopter and beam subassembly and is secured to the subassembly above the center of gravity of the latter, and the payload is carried below the beam structure below the center of gravity of the entire assembly.

Figure 5:
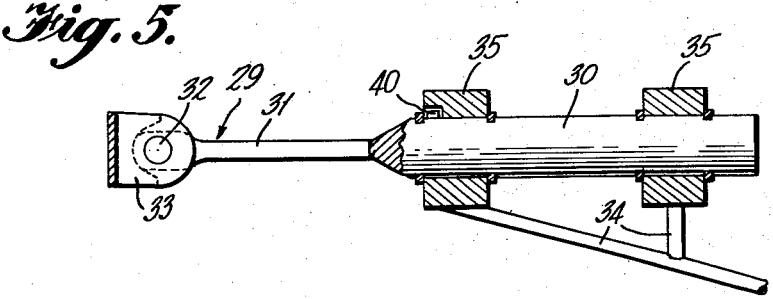
FIGURE 5 is a section view taken along the line 5—5 of FIGURE 4.

The outer ends of the arm portions 20, 21 are secured to the structural frame members of the helicopters 11, 12 in such a manner that the helicopters are free to rotate through preselected ranges in pitch and roll, but are held against relative movement in yaw, as described above. An example of a connecting facility by which this can be achieved is illustrated in FIGURES 4 and 5. Referring to FIGURES 4 and 5, the connection between the outer ends of the arms 20, 21 of the beam structure 13 and the helicopters 11, 12 is formed about a yoke-shaped or Y-shaped member 29 having a shaft 30 of circular cross-section adapted to be aligned axially with the longitudinal axis of the beam structure 13 and a pair of outwardly diverging bifurcated arms 31 terminating in end formations having circular openings extending therethrough along a common axis perpendicular to the axis of the shaft 30, through which pins 32 are projected. The ends of the pins 32 project at both ends from the terminal formations on the bifurcated arms 31 and are supported in bearing brackets or blocks 33 secured rigidly to the structural frame of the adjacent helicopter 11 or 12, whereby the pins provide a pivotal axis for the yoke-shaped member 29 permitting relative rotation of the helicopter fuselage about a roll axis of the fuselage displaced laterally from the longitudinal fuselage axis into alignment with the axes of the pins 32. The bearing brackets or blocks 33 will preferably be so formed as to provide stop shoulders coacting with the terminal formations on the bifurcated arms 31 to limit the extent of relative rotation about the axes of the pins to a range of about 30 degrees.

Elongated structural members 34 extend from the beam structure 13 to a pair of concentric, laterally spaced rings or sleeves 35 which surround the shaft 30 of the yoke-shaped member 29 and are journaled thereon for rotation of the shaft 30 about its axis relative to the beam structure 13. The rings or sleeves 35 are held against axial displacement along the shaft 30 by any desired conventional restraining means, such for example as separable rings projecting into concentric grooves provided in the surface of the shaft 30 and spaced axially of the shaft to bear against the opposite lateral surfaces of the rings 35.

By this connection, the helicopter is free to rotate relative to the beam structure 13 about the extended longitudinal axis of the cross beam 13, which is the pitch axis of the helicopter, and is free to rotate in roll about the axis through the pins 32. The helicopter is restrained, however, against rotation in yaw due to the longitudinally spaced connections with the structural frame of the helicopter provided by the pins 32 and bifurcated arms 31. This prevents angular displacement of the helicopters in yaw from the condition of parallelism of their longitudinal axes maintained by the connections with the beam assembly 13 to prevent approaching movement of the forward rotors 15 relative to each other or the rear rotors 16 relative to each other and thereby avoid any overlapping of the conical paths swept by the rotors and consequent possible interference resulting therefrom. The length of the beam structure 13 will preferably be such as to separate the helicopters 11, 12 by a sufficient distance to prevent overlapping of the rotor paths. It will be understood that variations in the degree of freedom of movement of the helicopters relative to the beam may be called for in certain installations. For example, the helicopters may be interconnected with the beam so as to provide freedom in pitch within selected limits while they are fixed in both roll and yaw, or the degree of movement in roll may be limited to any selected condition within the range from fixed condition to about thirty degrees relative movement.

Suitable quick disconnects or severable joints, operable remotely from each helicopter to release that helicopter from the beam structure are preferably provided, these being indicated generally by the reference character 36 and being located, for example, along the longitudinal structural members 17 of the beam arm portions 20, 21 at the desired intermediate location. Like quick disconnects, operable from any helicopter in the assembly, to release the balloon rigging lines 25 and the payload supporting cables 27 from the tower portion 22 of the beam structure 13 are also preferably provided, as indicated generally by the reference character 37. The specific structure and remote operating connections of these quick disconnects 36, 37 do not form a part of the present invention, and suitable forms for use in the invention are well-known to persons skilled in the art.

An auxiliary propulsion unit may also be provided on the beam structure 13, preferably located in the vertically projecting portion of the tower 22, consisting of a power plant 38 and shrouded propeller 39 to provide additional propulsion of the assembly. The propeller 39 is preferably shrouded to reduce its diameter and alleviate any danger of a rotating blade contacting the lines, rigging and so forth.

Preferably coacting means on the shaft 30 of the yoke-shaped member 29 and a surrounding ring 35 will be provided to restrict the rotation in pitch of the helicopters to a range of about thirty degrees, as, for example, a projection 40 on the shaft 20 extending into a recess of limited arc in the ring 35 as indicated in FIGURE 5.

Additionally, conventional dampening devices such as dash pot arrangements or hydraulic dampeners or the like may be associated with the relatively movable elements of the members providing the rotatable connections in pitch and roll to restrict the degree of freedom of rotation in these directions.

In the event the balloon 14 is designed to be of such a buoyancy as to approximately equal the weight of the entire assembly including the payload 28, it is apparent that ballast means will be required to maintain a slight negative buoyancy after the payload is released. This may be achieved, for example, by providing ballast tanks, schematically indicated at 41, on the beam structure suspended from the arms 20, 21 which may be filled with water, fuel, or other ballast medium. When the assembly has a payload 28 attached and is transporting the same to its destination, the ballast tanks 40 will be empty so that the buoyancy of the balloon substantially relieves the helicopter rotors of the load imposed by the weight of the assembly including the payload, and when the assembly reaches its destination and is ready to release the payload, the ballast tanks 40 must be filled with the ballast medium so as to provide a slight negative buoyancy for the assembly after release of the payload to permit effective control and propulsion of the unit back to the point of origin or to another destination as desired.

It will thus be apparent that a novel composite aircraft unit is provided by which the lift and propulsion which can be derived from the rotors of a plurality of helicopters is available to lift and transport heavy weights considerably beyond the normal capacity of helicopters in a novel and effective manner. The lift and propulsion forces of several helicopters is thereby made available in a convenient and practical manner and the arrangement is such that undesirable interference between the rotors of the several helicopters is avoided. The helicopters are free to rotate in pitch so as to utilize their towing ability and the attachment of the beam structure at the sides of the helicopters permits the helicopters to all land and take off with the beam structure attached.

While only one preferred embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

What is claimed is:

1. A composite aircraft unit comprising at least two similarly constructed, separate, complete, helicopters of the type normally capable of independent, controlled flight and means interconnecting the two helicopters together to form a plural helicopter subassembly comprising, a rigid interconnecting spacer beam extending transversely between the helicopters and securing means for connecting the adjacent sides of the helicopters to the opposite ends of the beam said beam and securing means coacting to hold the helicopters a fixed distance apart in side-by-side relation and including means for maintaining the helicopters against angular displacement in yaw relative to the beam, and a balloon secured to the beam above the center of gravity of said subassembly having a buoyancy at least sufficient to sustain slightly less than the weight of the entire balloon and subassembly when no payload is carried thereby.

2. A composite helicopter and balloon assist aircraft unit comprising a plural helicopter assembly including at least two laterally spaced separate, complete helicopters of the type normally capable of independent, controlled flight and means interconnecting the two helicopters together in side-by-side relation with the helicopters held a fixed distance against angular displacement in yaw relative to each other comprising a rigid interconnecting beam structure extending transversely between the helicopters and secured at the opposite ends of the beam structure to the sides of the helicopters, means for supporting a payload from the beam in substantial vertical alignment with the center of gravity of the plural helicopter assembly, and a balloon secured to said beam above the center of gravity of the plural helicopter assembly having a buoyancy at least great enough to provide slight negative buoyancy characteristics to the intercoupled balloon and plural helicopter assembly when the same is free of the weight of the payload whereby the helicopter rotors are substantially relieved of the burden of supporting the weight of the balloon and plural helicopter assembly and substantially the entire lifting force of the helicopter rotors is available to support the payload.

3. A composite helicopter and balloon assist aircraft unit comprising a plural helicopter assembly including at least two laterally spaced separate, complete helicopters of the type normally capable of independent, controlled flight and means interconnecting the two helicopters together in side-by-side relation with the helicopters held a fixed distance against angular displacement in yaw relative to each other comprising a rigid interconnecting beam structure extending transversely between the helicopters and secured at the opposite ends of the beam structure to the sides of the helicopters, means for supporting a payload from the beam in substantial vertical alignment with the center of gravity of the plural helicopter assembly, and a balloon secured to the beam above the center of gravity of the plural helicopter assembly having a buoyancy approximately equal to the weight of the entire balloon and plural helicopter assembly including the weight of a selected rated payload.

4. A composite aircraft of the helicopter type having substantial buoyancy comprising a plural helicopter assembly including at least two laterally spaced separate, complete helicopters of the type normally capable of independent, controlled flight arranged with their fore-and-aft axes in substantially parallel vertical planes and means interconnecting said helicopters together comprising a rigid interconnecting beam extending transversely between the helicopters having securing means at the opposite ends of the beam coupling the beam to the adjacent sides of the helicopters for holding said helicopters a fixed distance apart, said securing means accommodating rotation of the helicopters relative to the beam in selected flight axes and means restraining the helicopters against angular displacement in yaw relative to the beam from a condition wherein their fore-and-aft axes lie in substantially parallel planes, means on said beam for supporting a payload in vertical alignment with the center of gravity of the plural helicopter assembly, and a balloon secured to said beam above the center of gravity of the plural helicopter assembly having a buoyancy at least great enough to provide slight negative buoyancy characteristics to the helicopter, beam and balloon assembly when the same is free of the weight of the payload.

5. A composite aircraft of the helicopter type having substantial buoyancy characteristics comprising a plural helicopter assembly including at least two laterally spaced separate, complete tandem rotor helicopters of the type normally capable of independent, controlled flight and having a rotor at each of the fore and aft ends thereof and means for interconnecting said helicopters together comprising a rigid interconnecting beam structure extending transversely along an interconnecting axis between the helicopters and securing means at the opposite ends of the beam structure coupling the beam structure to the adjacent sides of the helicopters for holding the helicopters a fixed distance apart in side-by-side relation with their fore-and-aft axes disposed in parallel planes normal to said interconnecting axis, said securing means including means providing a selected degree of movement of each helicopter relative to the beam in pitch and roll and means rigidly holding the helicopters against movement relative to the beam in yaw to maintain the fore-and-aft axes of the helicopters in said parallel planes, means depending from said beam structure for supporting a payload in vertical alignment with the center of gravity of the plural helicopter assembly below said beam structure and above the lowermost points of the helicopters, and a balloon secured to said beam structure above the center of gravity of the plural helicopter assembly having a buoyancy at least great enough to impart slight negative buoyancy characteristics to the balloon and plural helicopter assembly when the same is free of the weight of the payload.

6. A composite helicopter and balloon assist aircraft unit comprising a plural helicopter assembly including at least two laterally spaced separate, complete helicopters of the type normally capable of independent, controlled flight and means interconnecting the two helicopters together in side-by-side relation with the helicopters held a fixed distance against angular displacement in yaw relative to each other comprising a rigid interconnecting beam structure extending transversely between the helicopters and secured at the opposite ends of the beam structure to the sides of the helicopters, means operable from each helicopter for releasing that helicopter from at least the major portion of said beam structure, means for supporting a payload from the beam in substantial vertical alignment with the center of gravity of the plural helicopter assembly, and a balloon secured to said beam above the center of gravity of the plural helicopter assembly having a buoyancy at least great enough to impart slight negative buoyancy characteristics to the intercoupled balloon and plural helicopter assembly when the same is free of the weight of the payload whereby the helicopter rotors are substantially relieved of the burden of supporting the weight of the balloon and plural helicopter assembly and substantially the entire lifting force of the helicopter rotors is available to support the payload.

7. A composite helicopter and ballon assist aircraft unit comprising at least two laterally spaced separate, complete helicopters of the type normally capable of independent, controlled flight and means interconnecting said helicopters comprising an elongated rigid interconnecting beam structure extending transversely between the helicopters having securing means at the opposite ends thereof for securing the beam structure to the sides of the helicopters to form a plural helicopter assembly including means for holding the helicopters a fixed distance apart in side-by-side relation and means restraining the helicopters against angular displacement in yaw relative to the beam structure means for supporting a payload in substantial vertical alignment with the center of gravity of the plural helicopter assembly, a balloon secured to said beam substantially midway between the opposite ends of said beam structure above the center of gravity of the plural helicopter assembly having a buoyancy at least great enough to impart slight negative buoyancy characteristics to the balloon and plural helicopter assembly when the same is free of the weight of the payload, and the beam structure including separable joint means between each helicopter and the zone of attachment of the balloon to the beam structure and operable from the adjacent helicopter for releasing that helicopter from the assembly.

8. A composite helicopter and balloon assist aircraft unit comprising at least two laterally spaced separate, complete helicopters of the type normally capable of independent, controlled flight and means interconnecting said helicopters comprising an elongated rigid interconnecting beam structure extending transversely between the helicopters having securing means at the opposite ends thereof for securing the beam structure to the sides of the helicopters to form a plural helicopter assembly including means for holding the helicopters a fixed distance apart in side-by-side relation and means restraining the helicopters against angular displacement in yaw relative to the beam structure, means for supporting a payload in substantial vertical alignment with the center of gravity of the plural helicopter assembly, a balloon secured to said beam substantially midway between the opposite ends of said beam structure above the center of gravity of the plural helicopter assembly having a buoyancy at least great enough to provide slight negative buoyancy characteristics to the balloon and plural helicopter assembly when the same is free of the weight of the payload, and quick disconnect means securing said balloon to said beam structure and operable from any helicopter in the assembly for releasing the balloon from the assembly.

References Cited in the file of this patent

UNITED STATES PATENTS

| | | |
|---|---|---|
| 1,482,243 | Montells | Jan. 29, 1924 |
| 2,704,192 | Paul | Mar. 15, 1955 |
| 2,721,044 | Young | Oct. 18, 1955 |
| 2,730,398 | Huested | Jan. 10, 1956 |

FOREIGN PATENTS

| | | |
|---|---|---|
| 12,787 | Switzerland | Aug. 26, 1896 |